United States Patent [19]

Buckley et al.

[11] 4,399,807

[45] Aug. 23, 1983

[54] METHOD AND APPARATUS FOR OVERTEMPERATURE CONTROL OF SOLAR WATER HEATING SYSTEM

[75] Inventors: Bruce S. Buckley, Berkeley; Thomas A. R. Guldman, Kentfield, both of Calif.

[73] Assignee: Chevron Research Company, San Francisco, Calif.

[21] Appl. No.: 271,955

[22] Filed: Jun. 9, 1981

[51] Int. Cl.³ ............................................. F24J 3/02
[52] U.S. Cl. .................................. 126/418; 126/419; 126/434
[58] Field of Search ............... 126/418, 419, 420, 435, 126/422, 436, 437; 165/1; 137/59-62

[56] References Cited

U.S. PATENT DOCUMENTS

| | | | |
|---|---|---|---|
| 4,153,040 | 5/1979 | Harrison et al. | 126/420 |
| 4,191,166 | 3/1980 | Saarem et al. | 126/422 |
| 4,244,352 | 1/1981 | Foster | 126/418 |
| 4,280,478 | 7/1981 | Duval et al. | 126/420 |

Primary Examiner—James C. Yeung
Attorney, Agent, or Firm—Burns, Doane, Swecker & Mathis

[57] ABSTRACT

Automatic overtemperature control system for solar water heater panels is disclosed. In response to lack of liquid circulation through a solar panel, either through loss of liquid or failure to use water heated in the panel valve means are actuated at a preselectable temperature value to introduce cooling water into the circulation system which includes the solar panel. Such system assures the integrity of circulation through the solar panel and against panel degradation due to overheating. Cooling water is added directly to the panel or through an interconnected hot water storage tank. If desired, the system may be used for direct filling the solar panel or as a back-up to conventional float valve operated fill system. The automatic overtemperature control system is applicable either to thermosiphon or pressured circulation through the solar panel to maintain its temperature below a preselected value.

3 Claims, 5 Drawing Figures

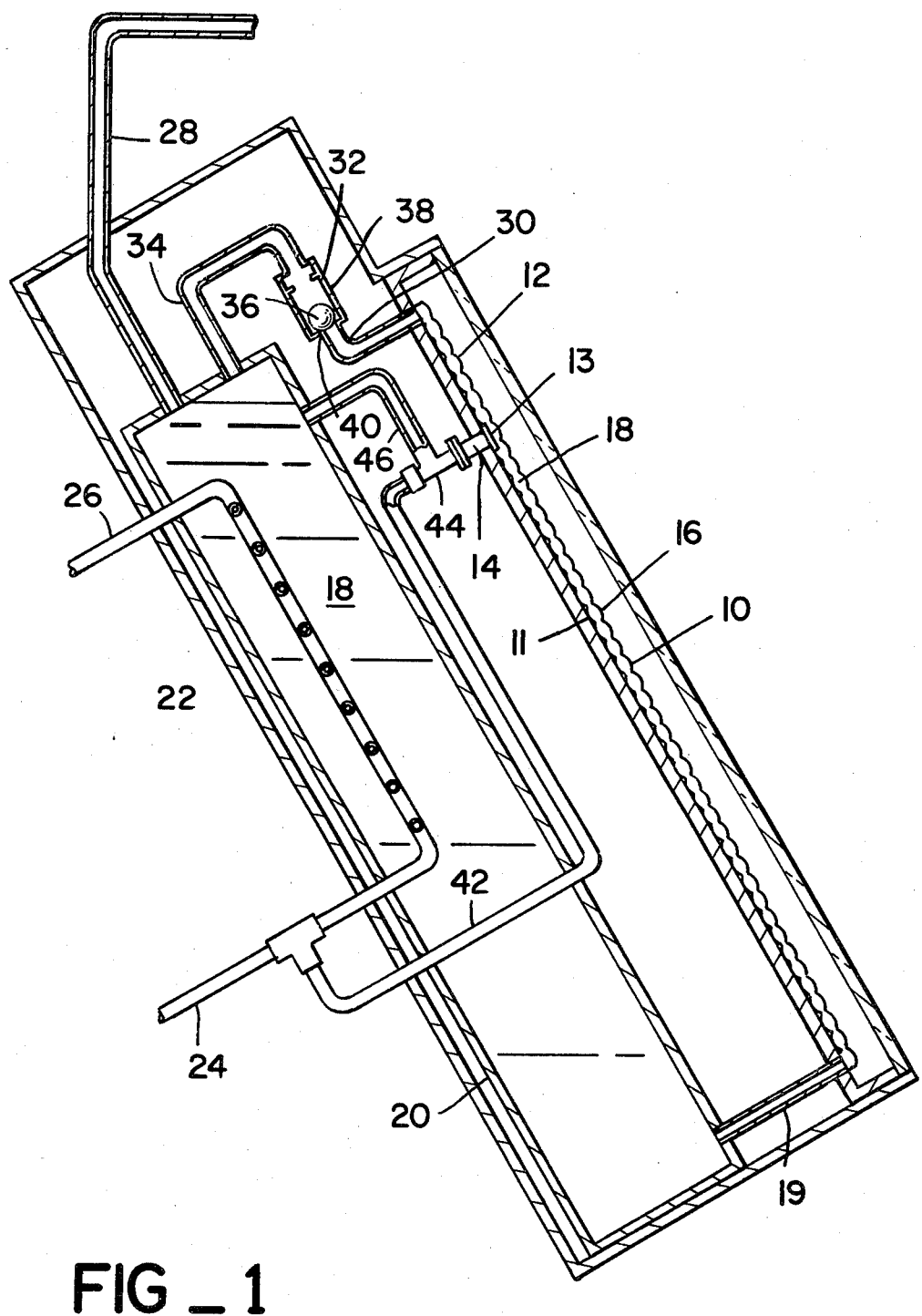
FIG_1

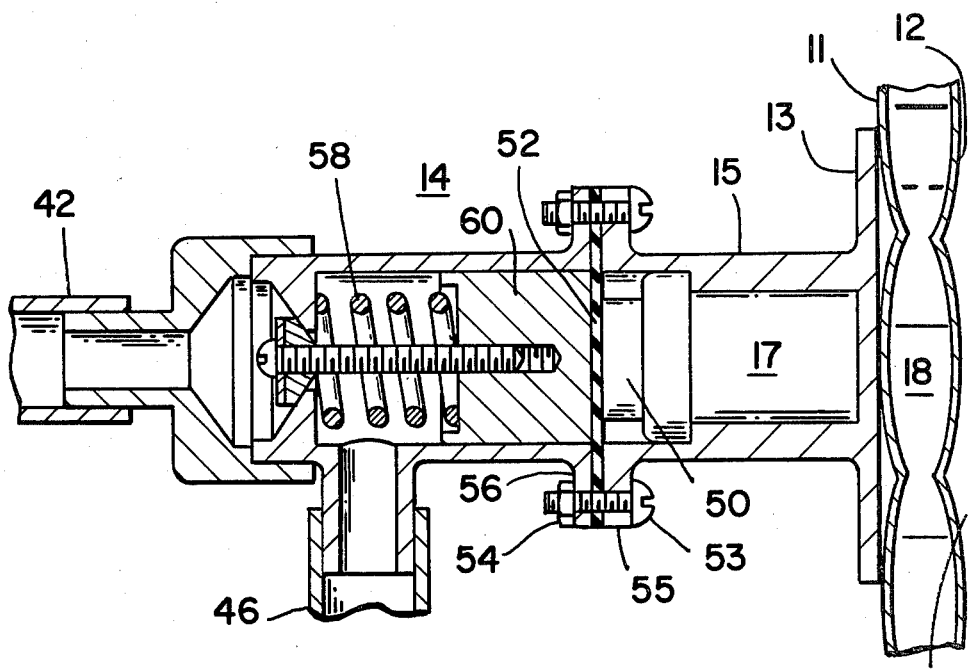
FIG_2
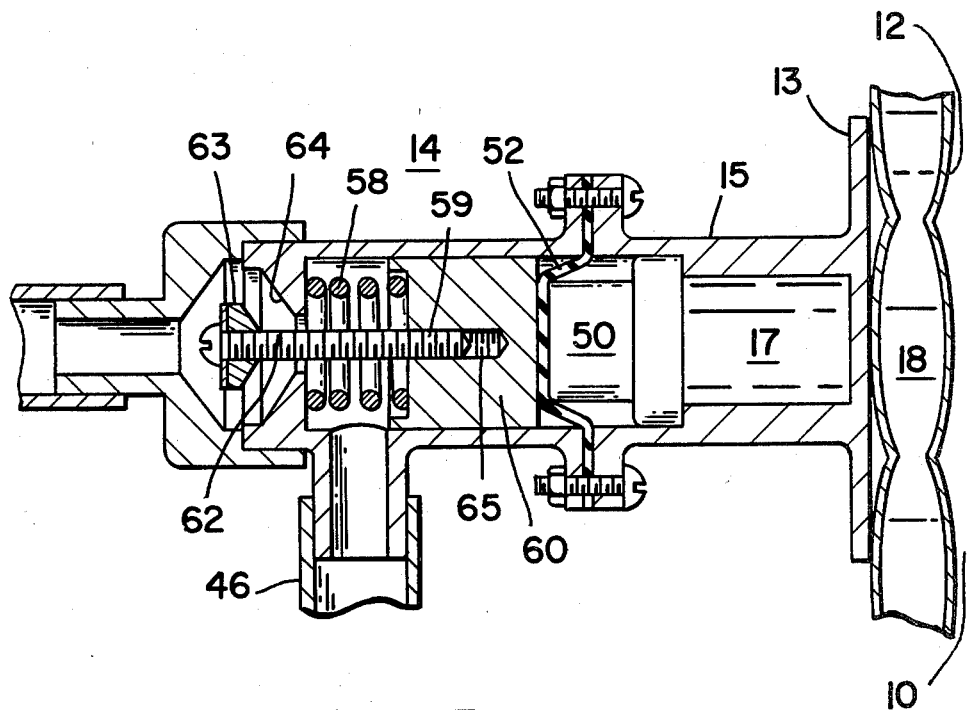
FIG_3

FIG_4
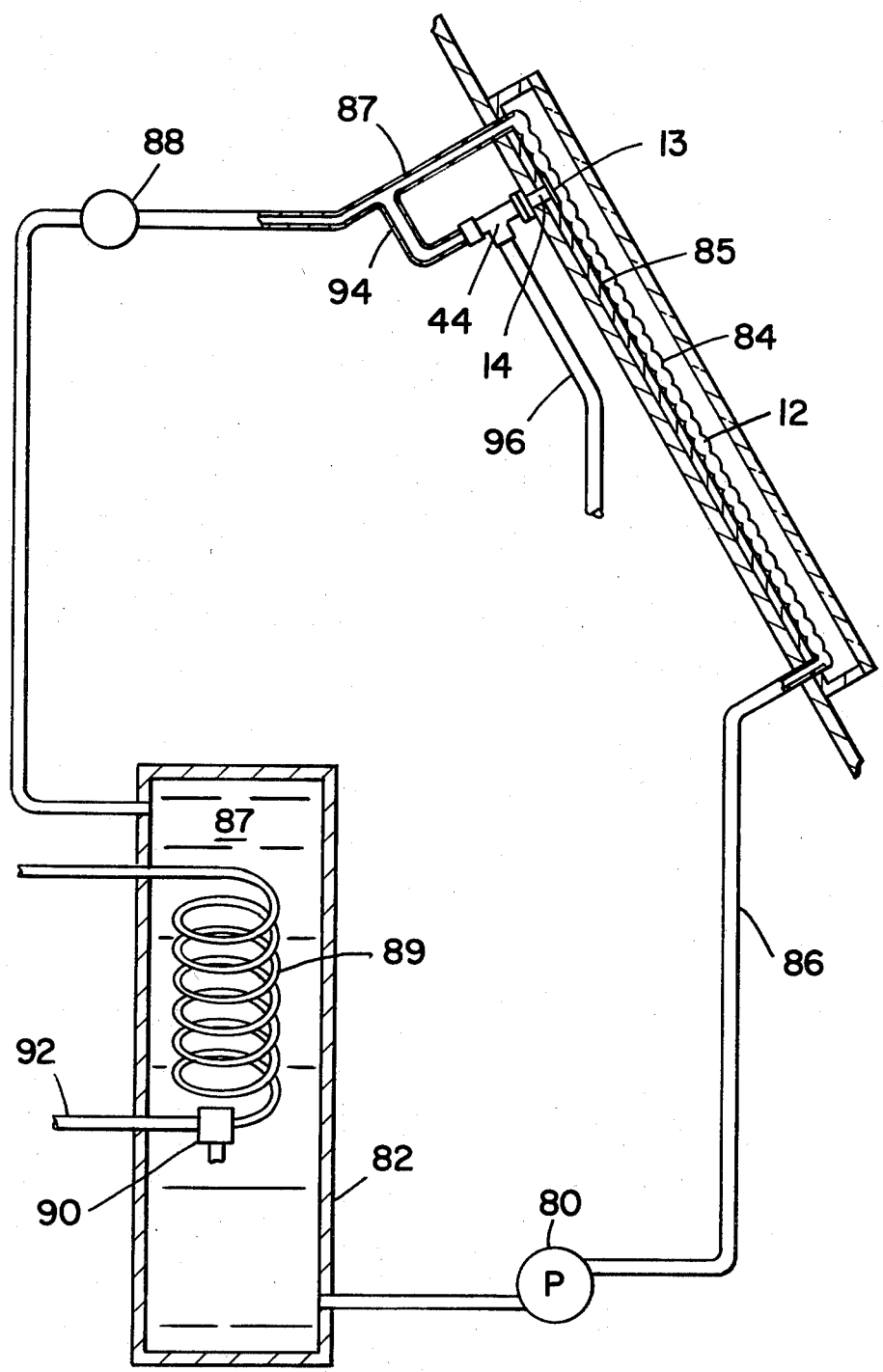

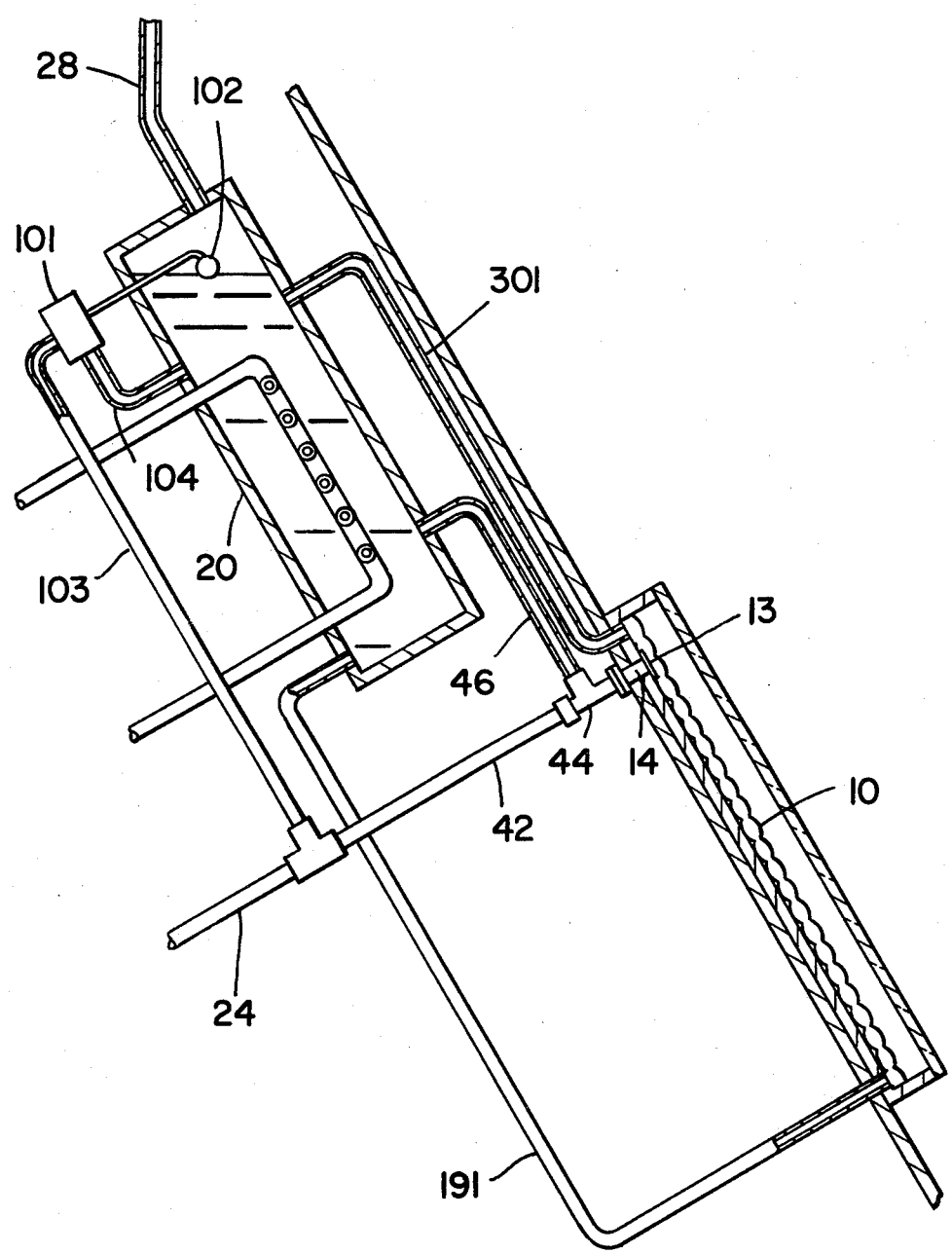
FIG_5

METHOD AND APPARATUS FOR OVERTEMPERATURE CONTROL OF SOLAR WATER HEATING SYSTEM

TECHNICAL FIELD

This invention relates to solar water heaters. More particularly, it relates to a method of, and apparatus for, preventing overheating and thermal destruction of a solar collector panel in a closed circulation system including an interconnected hot water storage tank suitable for heating domestic hot water.

It is a particular object of the invention to provide an automatic system for protecting such a solar collector from overtemperature operation by sensing temperature of the solar collector and in response thereto discharging overheated water or steam from the hot water section of the circulating system and simultaneously adding sufficient cold water to the system, either by directly mixing cold water with overheated water in the system or by refilling the hot water section with colder water. Alternatively, in response to a drop in water level of the closed circulation system, due to such discharge, cold water is added to the system in an amount and to an extent necessary to restore circulation, cooling the solar panel and thereby correcting the overtemperature condition. A further particularly important feature of the present invention is that such an automatic temperature system may also control the supply of operating water to the system so that even if there is a failure of the conventional float valve, due to corrosion or mechanical wear of the float, mechanical linkages, springs, or valves, the solar panel will not suffer from lack of circulating water. Thus, a fully passive solar water heating system is made possible by the present invention without a float valve and without loss of an essential function of such a valve, namely, initial fill and maintenance of the water level to assure thermosiphon circulation through the solar panel.

BACKGROUND ART

In known passive, or low pressure, solar water heating systems, a solar collector panel absorbs solar energy into a heat exchange liquid, normally water. For maximum solar heating, the collector panel is tilted from about 20 to 60 degrees from horizontal depending upon geographical latitude. In a passive system, by thermosiphon operation, cooler water is admitted to the bottom of the solar collector after traversing a storage tank which may or may not include a heat exchanger. Water leaves the top of the solar collector and passes through a one-way valve. This valve permits water heated in the solar panel to pass to the storage tank, but reverse circulation is prevented. Such action prevents reverse thermosiphoning of hot water from cooling the water in the storage tank in cloudy weather or at night. In other thermosiphon devices, reverse circulation may be prevented by having the storage tank above the solar collector. The heated water may pass through either the tank containing a heat exchanger or a heat exchanger in the tank.

In a "passive" system no external power is required to pump liquid between the collector and the storage tank, but for continuous liquid circulation the water level must be maintained above the highest inlet pipe from the collector into the storage tank. Thermosiphoning is the sole motive power for liquid circulation in the closed loop. If liquid is lost from the system there may be a break in this continuous circulation path. A break or separation in the loop of more than about one half inch of vertical height will prevent circulation under the weak force of thermosiphoning. In such a case, the system fails and the only indication may be a lack of heat output from the solar system.

If circulation is broken, the relatively small amount of heated water in the solar collector panel will not recirculate to the storage tank. Thus, cooler water cannot enter the bottom of the collector panel from the storage tank. Consequently, the "trapped" liquid in the panel will boil. In the usual arrangement, the circulation system is vented to the atmosphere. Thus, the liquid in the panel evaporates, thereby further depleting water from the system. Continued exposure of the collector to solar radiation without adequate heat removal can lead to early deterioration and destruction of the collector. This is particularly true where the collector is formed of non-metallic materials.

In low pressure solar water heating systems, similar problems can arise. Such systems are similar to passive systems but may use a low pressure, or low volume, mechanical pump to assist or replace thermosiphon circulation. Mechanical pumps are of course subject to failure because of loss of electric power to the pump motor, pump bearing seizure, impeller stall and other electrical or mechanical problems. When forced circulation ceases, the liquid in the collector can overheat or evaporate so that damage to the collector panel results.

No adequate solutions have been proposed to such problems in solar water heating systems and particularly for such systems which desirably should last 10 to 20 years in continuous domestic or household water heating service, with little or no maintenance.

DISCLOSURE OF INVENTION

In accordance with the present invention the foregoing and other problems are solved by an automatic overtemperature control system which relieves excess temperature and/or pressure in the solar collector. Loss of liquid circulation in the solar collector panel is prevented by valve means responsive to the temperature in the upper or heated water portion of the solar collector panel. In response to an overtemperature condition, and at a preselected temperature, both to assure continued operation and to prevent thermal degradation of the material forming the solar collector, the valve means is actuated to supply cold water into the heated water portion of the closed-loop water circulating system. Further in response to such chosen overtemperature condition, hot water is discharged from the circulation system to maintain fill to the desired extent.

In a passive system, cold water, as from the water supply system being heated by the passive solar system, is admitted directly to the system. By refilling the system, thermosiphon circulation is re-established, thereby relieving the overtemperature condition. All of such functions are performed automatically, either as backup to a float valve for filling the system, or as a full replacement for the functions of such a valve.

In a low pressure system, cold water is desirably added to the circulation system in response to a predetermined drop in pressure in the system due to discharge of overtemperature water directly from the solar collector. The pressure of the added water is sufficient to force liquid to flow thorugh the circulating pump even if it is not operative. Further, such fresh cooling water is added for so long as water is being discharged from the system by the valve means operating in response to the overtemperature control means, and such overtemperature condition continues. Upon reduction in the temperature of the solar collector panel below said condition, the solar system is returned to normal operation without maintenance.

Further objects and advantages of the present invention will become apparent from the following detailed description of the best modes for carrying out the invention taken in conjunction with the drawings which form an integral part of this specification.

BRIEF DESCRIPTION OF THE DRAWINGS

FIG. 1 is a perspective view, partially in cross section, of a passive solar water heater system which includes the overtemperature control system of this invention.

FIGS. 2 and 3 are cross sectional views of an overtemperature responsive valve means suitable for use in the embodiments of the invention shown in FIGS. 1, 4 and 5. FIG. 2 particularly shows the unactuated position of the valve means. FIG. 3 shows the actuated condition.

FIG. 4 is a perspective view, similar to FIG. 1, of a low pressure solar water heater system, partially in cross section, including an alternate embodiment of the overtemperature control system according to the present invention.

FIG. 5 is a perspective view, partially in cross-section, of an alternate form of thermosiphon system, similar to the arrangement of FIG. 1, in accordance with the present invention.

BEST MODES OF CARRYING OUT THE INVENTION

Referring now to the drawings, FIG. 1 illustrates a passive solar water heating system to which the present invention has been applied; it is of the check valve type discussed earlier but may also be of the "tank-over-collector" type. To prevent overtemperature in the upper portion 12 of solar collector panel 10, temperature sensing element 14 (as best seen in FIGS. 3 and 4) includes a chamber 15 filled with a thermal expansion fluid 17, such as wax. Chamber 15 is affixed in heat transfer relation by metallic plate 13 to the surface 11 of upper portion 12 of panel 10. Alternatively, plate 13, including chamber 15, may be inserted into liquid 18 in collector panel 10.

When solar energy is absorbed by liquid 18 in collector panel 10, at a rate greater than heat is removed from the circulating system, liquid 18 may boil. Heat can be extracted from interconnected heat storage tank 20 by heat exchanger coil 22, positioned in upper (and usually hotter) portion of tank 20. Coil 22 is connected to a household water heating system by inlet line 24 and outlet line 26. Such boiling of liquid 18 can result in liquid loss from overflow or vapor loss through line 28 connected to the top of storage tank 20 which prevents rupture of solar panel 10 or storage tank 20. If desirable, line 28 may include a pressure relief valve (not shown) to prevent liquid loss by evaporation or to maintain tank pressure.

Because the arrangement of FIG. 1 is a passive system, flow of liquid 18 depends solely upon the thermosiphon effect to move it from the lower end of storage tank 20 through conduit 19 and upwardly in panel 10. Such upward movement is due to thermal expansion (a slight decrease in density) of liquid 18 in the relatively thin tubes or space formed between back surface 11 and solar absorption surface 16 of panel 10. Heated liquid 18 thus moves upwardly into riser tube 30 and through one way valve 32 to the inlet line 34 of tank 20, in this embodiment.

Suitable forms of one way valves are shown in my U.S. Pat. Nos. 4,050,508, and 4,137,964 and in U.S. application Ser. No. 216,677, H. W. Sigworth, Jr., assigned to the assignee of the present application.

From the foregoing it will be apparent that if heat is generated in solar panel 10 faster than heat is withdrawn from storage tank 20 (either by cooling water in heat exchange coil 22, or by extracting hot water from tank 20 in the situation where no heat exchanger is used), boiling and loss of fluid will eventually occur through pressure relief means, such as by line 28. If enough liquid is lost from the closed circuit, including panel 10, tank 20, conduits 19 and 30, and valve 32, continuity of the circulation loop is lost and flow will cease. Under such conditions, liquid in collector panel 10 is stagnant and can result in a rapid rise in temperature. This in turn may lead to deterioration or destruction where the panel is made of non-metallic materials. Such effects can be avoided by introducing water into the system from the supply line 24 by way of auxiliary line 42 connected through overtemperature control valve 44 and line 46 to the top of tank 20. Alternatively, of course, line 46 may be connected directly to the top of solar panel 10 or riser line 30, or even to tank inlet line 34.

In accordance with the invention, as particularly shown in FIGS. 2 and 3, when plate 13 of temperature responsive element 14 detects a temperature in panel 10 above a preselected value, say 220° F., wax 17 having a narrow melting range, say 215° to 230° F., will increase in volume, by melting and expand in chamber 15. Such expansion actuates piston 50 against flexible diaphragm 52 (clamped between cylinder 15 and valve 44, as by screws 53 and nuts 54 through flanges 55 and 56, respectively on cylinder 15 and valve 44 and closing spring 58 in valve 44. Such action, as best seen in FIG. 3 presses valve piston 60, valve stem 62 to unseat valve seal 63 from valve seat 64. This permits cold water to flow in from line 42 and out line 46. Such flow will continue until the temperature in panel 10 is reduced to a temperature which is sufficiently below the melting temperature of expansible fluid 17 to cause resolidification of the wax. This action, through the restoring force of valve spring 58 and diaphragm 52, will cause valve seal 63 to again reseat on valve seat 64, as in FIG. 2, and automatically stop water flow through valve 44. Valve stem 62 is adjustable by turning its threads 59 relative to threads 65 in piston 60 to change the restoring force of spring 58 on piston 60. In the optimum embodiment piston 60 and the diaphragm 52 are made of thermal insulating material to prevent valve seal 63 from prematurely closing by the cooling effect of the cold water flowing from line 42 through valve 44.

A particular advantage of the above-described passive system for automatic control of overtemperature in the solar collector panel lies in the fact that such systems are frequently located on the roof of a home or in other places that will not detract from the architectural design of the buildings. In such locations, filling of the system initially, and replenishing of liquid (which over time is slowly lost even without boiling) are necessary. The present system makes possible such automatic filling and replenishment without further installation or maintenance of the system and without necessarily requiring use of a float valve for initial filling or refilling of the system.

FIG. 4 illustrates application of the present invention to a low pressure, forced circulation system. As distinguished from the embodiment of FIG. 1, a pump 80 circulates liquid 81 from storage tank 82, usually at a remote location, such as inside a house, to solar panel 84 located on a roof or other exposed location for absorbing solar energy. The flow rate in such a system is low to permit adequate residence time for liquid 81 pumped through panel 84 by inlet line 86 and through outlet line 87 back to tank 82. Desirably, where forced circulation is by a centrifugal pump, such as pump 80, a one way valve 88 is located in line 87 to prevent reverse circulation of heated liquid 81 from tank 82 to panel 84.

Heat is removed from liquid 81 by heat exchanger 89 located in storage tank 82. As a suitable method of filling such a system, pressure responsive valve 90 is connected to cold water inlet line 92. Valve 90 may be adjusted so that when the hydrostatic head of liquid 81 is less than that required to keep the system filled, such valve opens to admit additional cold water into tank 82.

As further shown in FIG. 4, temperature responsive means 14 is mounted with plate 13 in heat exchange relation to inner surface 85 of panel 84, or in liquid 81. However, in this embodiment, line 94 is connected directly into hot liquid return line 87 so that in response to an overtemperature condition in panel 81, valve 44 opens to discharge hot water directly to drain line 96. This drops the pressure in the system below the pressure preset by valve 90 in tank 82. Accordingly, valve 90 opens to admit cold water to the system and such flow will continue until the temperature of panel 84 falls below that required to reduce the volume of fluid 17, thereby to permit valve spring 58 to close valve 44 for automatic return to normal operating conditions.

In the arrangement of FIG. 4, such overtemperature condition in panel 84 may arise if pump 80 fails on a bright day. However, in such a system, where pump 80 is a centrifugal pump operating a rotor rather than pistons, a rise in water pressure, as applied through valve 90 and tank 82 will cause flow through line 86 and directly through pump 80 without rotation of the pump impeller. However, if a piston pump is used in the system, check valve 88 is not required so that a rise in pressure in tank 82 may create reverse flow through return line 87 to refill panel 84.

FIG. 5 shows a system, similar to FIG. 1, wherein the thermosiphon effect is used to circulate heated water through collector panel 10, but hot water storage tank 20 is positioned above panel 10. In this way a reverse circulation valve, such as 32 in FIG. 1, is not required to prevent heated water in tank 20 from returning to panel 10 if it is not being heated by the sun. As indicated, the lowest level of fluid feed line 191 from tank 20 must be above the highest point of panel 10, outlet line 301. To maintain circulation even under overtemperature conditions plate 13 of temperature sensing element 14 actuates valve 44 to admit water from cold water line 42 into tank 20 by way of line 46 to fill tank 20. As also shown, a float valve 101 including a float arm 102 normally controls the level of fluid in tank 20. Valve 101 connects line 103 into tank 20 through line 104 to supply fill water from cold water line 24. In the present embodiment, whether or not valve 101, fails or becomes inoperative, panel 10 is protected against overheating, and does so even though tank 20 is filled sufficiently to assure thermosiphon action. A relief line 28 permits overflow of the circulation system by cold water that is added to relieve the overtemperature condition when valve 14 is actuated. Valve 14 is then held open until the temperature of the system water is reduced sufficiently to permit it to reclose automatically.

While only a few embodiments and examples of the present invention have been illustrated and described above, various modifications and changes will become evident to those skilled in the art of solar water heating without departing from the spirit or scope of the present disclosure. All such modifications or changes coming within the scope of the appended claims are intended to be included therein.

What is claimed is:

1. In a solar water heating system including a solar collector panel, a water storage tank, a normally closed water circulating conduit means interconnecting said panel and said tank and a one-way valve for controlling the flow of water between said solar collector panel and said water storage tank, an overtemperature control system which comprises temperature responsive means mounted on said solar collector panel to sense the temperature thereof, cold water supply means, valve means in said overtemperature control system operable by said temperature responsive means for introducing cold water from said cold water supply means into said overtemperature control system and conduit means for dumping over-heated water from said closed water circulating conduit means when the temperature of water in said solar collector panel exceeds a predetermined value; said solar collector panel, said water storage tank, said water circulating conduit means and said overtemperature control system are closely coupled and isolated from any hot water supply system to which heat is to be added.

2. An overtemperature control system in accordance with claim 1 in which said overtemperature control system includes a material of relatively low thermal conductivity between said temperature responsive means and said valve means to prevent premature closure of said valve means during flow of cool water through said overtemperature control system.

3. Apparatus for continuously maintaining the temperature of a closed solar water heating system below a predetermined temperature value which comprises:
   means for sensing the temperature of said closed solar water heating system,
   means responsive to said temperature sensing means for introducing a supply of cool water into said solar water heating system which includes, thermal expansion fluid means operable in response to said predetermined temperature value and pressure responsive valve means operable by said thermal expansion fluid means for controlling the flow of said cool water into said closed solar water heating system,
   means for discharging hot water from said solar water heating system to permit said cool water to replenish said closed solar water heating system in an amount and to an extent required to reduce the temperature of said thermal expansion fluid means below said predetermined temperature value, and
   said means responsive to said temperature sensing means being adapted, upon such reduction in the temperature of said closed solar water heating system below said predetermined temperature value, to terminate the flow of cool water into said closed solar water heating system,
   whereby said closed solar water heating system may continuously maintain a temperature below said predetermined temperature value.

* * * * *